N. & L. NILSON.
MOWING MACHINE.
APPLICATION FILED MAY 29, 1911.

1,111,757.

Patented Sept. 29, 1914.
2 SHEETS—SHEET 1.

WITNESSES

INVENTORS
NILS NILSON
LEONARD NILSON
BY Paul & Paul
ATTORNEYS

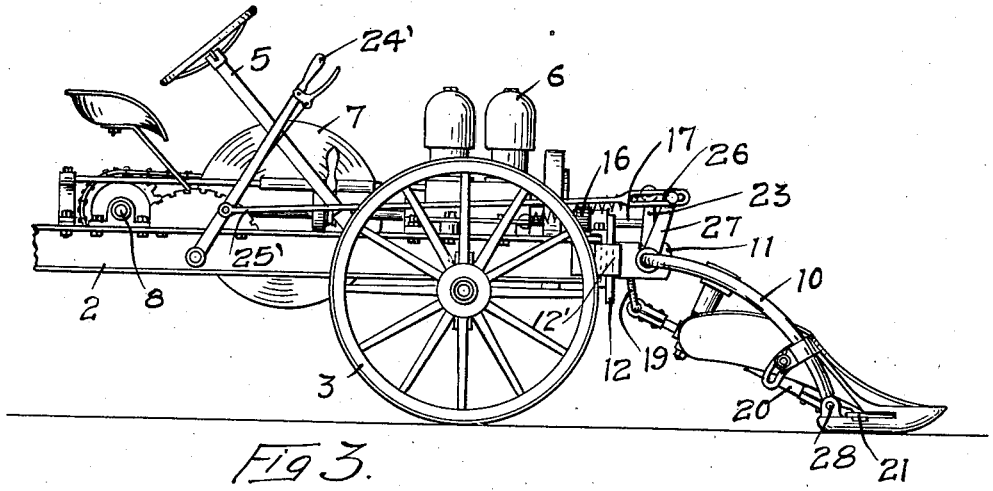
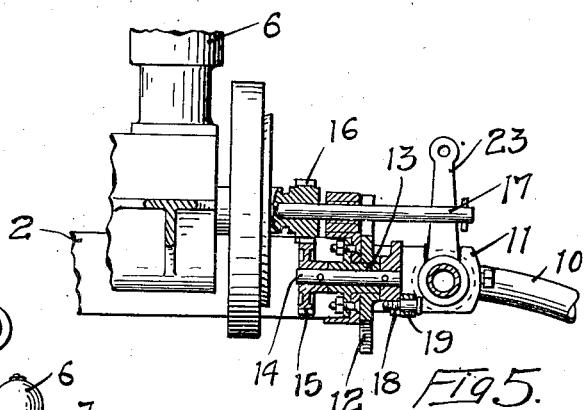
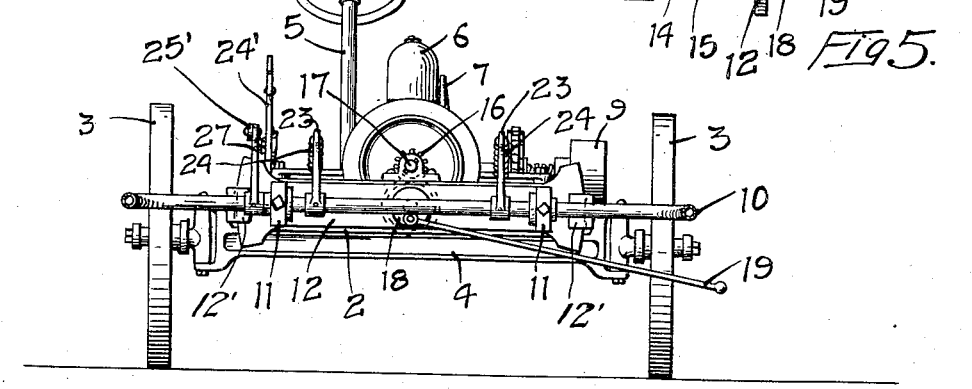

UNITED STATES PATENT OFFICE.

NILS NILSON AND LEONARD NILSON, OF WAYZATA, MINNESOTA.

MOWING-MACHINE.

1,111,757. Specification of Letters Patent. Patented Sept. 29, 1914.

Application filed May 29, 1911. Serial No. 630,221.

*To all whom it may concern:*

Be it known that we, NILS NILSON and LEONARD NILSON, of Wayzata, Hennepin county, Minnesota, have invented certain new and useful Improvements in Mowing-Machines, of which the following is a specification.

Our invention relates to mowing machines operated from a source of power carried by the machine and the object of the invention is to provide a mowing attachment which will automatically adapt itself to irregularities of the ground over which the machine is moving.

A further object is to provide a mowing apparatus that is simple in construction and easily operated.

Other objects of the invention will appear from the following detailed description.

Our invention consists generally in means connecting the frame of the machine with the cutter bar frame to allow oscillation of said cutter-bar frame to adapt it for inequalities of the ground over which the machine is running.

Figure 1:
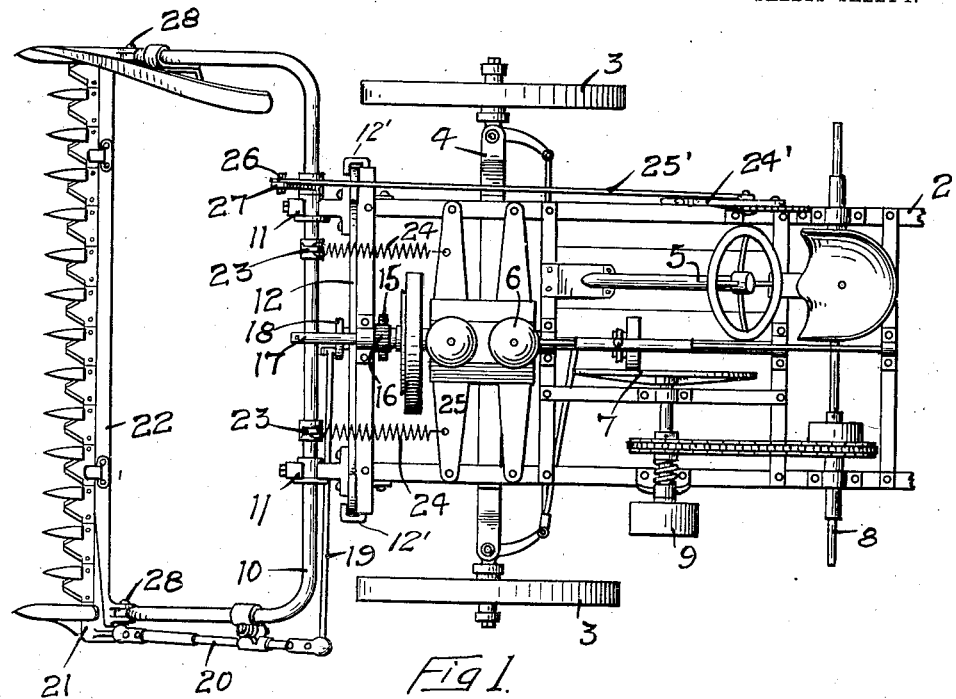
Figure 2:
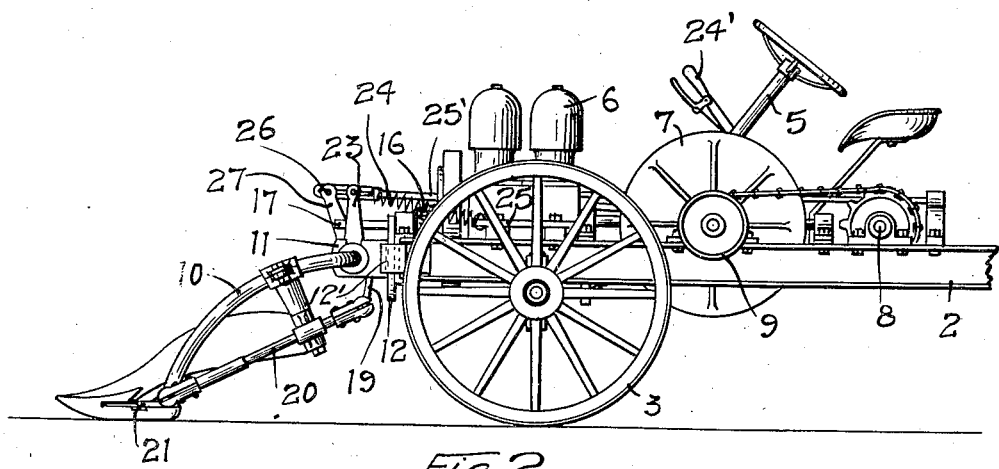

In the accompanying drawings forming part of this specification, Figure 1 is a plan view of a mowing machine embodying our invention, Fig. 2 is a side elevation of the same, looking at one side of the machine, Fig. 3 is a similar view, looking at the opposite side of the machine, Fig. 4 is a front view with the mowing attachment removed, Fig. 5 is a detail sectional view illustrating the manner of mounting the mower frame on the machine.

In the drawing, 2 represents the frame of the machine, 3 the forward carrying wheels having their spindles pivoted on the axle 4 in the usual way. The oscillation of these wheels to steer the machine is controlled by the steering post 5.

6 is a source of power, such as a gasolene engine, mounted on the forward portion of the machine and having a friction drive 7 through which power may be transmitted to a shaft 8 and also to a pulley 9.

10 is a mower frame having its rear portion supported in brackets 11 on a rocker plate 12. This plate is pivoted at its longitudinal center on a sleeve 13 that is mounted on a shaft 14 and is free to oscillate in a vertical plane. Guides 12' are provided on each side of said frame for the ends of said rocker plate. A gear 15 is secured on said shaft meshing with a pinion 16 on a shaft 17. A crank disk 18 is secured on the shaft 14 and is provided with a pitman rod 19. This rod is attached to a rod 20 which in turn is connected to the knife 21, slidable in the usual way on the finger bar 22. The mower frame is thus centrally supported by the rocker plate 12 and is free to oscillate up and down thereon to accommodate itself to the inequalities of the ground. The frame 10 is also provided with arms 23 connected by springs 24 with a cross bar 25, said springs yieldingly supporting the mower frame, allowing it to rise and fall on its pivots in the brackets 11 as the machine moves across the field. The mower frame thus has a double oscillation, one on its pivots in the brackets 11 and the other on the central pivotal support of the rocker 12. The former movement allows the frame to dip down into depressions while the knife operates horizontally; while the latter pivotal support of the frame permits endwise tilting of the knife to ride over rocks or other obstructions in the field. An operating lever 24' is mounted on the machine frame and a rod 25' is pivotally connected with this lever and has a sliding connection at 26 with an arm 27. We prefer also to pivot the finger bar 22 at 28 to the frame 10 to allow the finger bar to be easily adjusted to its cutting position.

We claim as our invention:

1. The combination, with a frame having carrying wheels and a source of motive power mounted thereon, of a rocker plate pivoted at the longitudinal center thereof to oscillate in a vertical plane, a mower frame pivotally supported by said plate and frame to tilt laterally on the pivot of said rocker plate and also having an independent tilting movement on its pivots, a finger bar, and a cutter bar operatively connected with said source of power.

2. A mower comprising a wheeled frame, and a source of motive power mounted thereon, a mower frame, a rocker plate having a horizontal pivot on said wheeled frame and supporting said mower frame, said plate extending transversely of said wheeled frame from side to side, guides for the end portions of said plate, said mower frame having a finger bar and a cutter bar operatively connected with said source of power and being free to tilt with the movement of said rocker plate in a vertical plane to allow the forward portion of said mower frame to rise and fall with the inequalities of the ground.

3. A mower comprising a wheeled frame, a source of power mounted thereon, a rocker plate having a centrally arranged horizontal pivot on the forward portion of said frame and free to oscillate in a vertical plane, brackets mounted on said plate and projecting forwardly thereon, a mower frame journaled in said brackets and having a swinging movement in its bearings toward or from the ground line and also being free to oscillate with said rocker plate on its pivot, a finger bar, and a cutter bar operatively connected with said source of power.

4. The combination, with a wheeled frame and a source of motive power mounted thereon, of a shaft mounted in the forward portion of said frame and having a driving connection with said source of motive power, a sleeve mounted on said shaft, a rocker plate mounted centrally, intermediate to its ends, on said sleeve and free to oscillate thereon in a vertical plane, a mower frame carried by said rocker plate, a crank disk mounted on said shaft, a finger bar, and a cutter bar having a driving connection with said crank disk.

5. The combination, with a wheeled frame and a source of motive power mounted thereon, of a rocker plate pivoted at the center of its longitudinal axis on the forward portion of said frame and free to oscillate in a vertical plane, a crank disk concentric with the pivot of said rocker plate, a mower frame supported by said rocker plate and free to oscillate therewith and also having a tilting movement toward and from the ground line independently of said rocker plate, a finger bar, and a cutter bar carried by said mower frame and having a pitman-rod connection with said crank disk.

In witness whereof, we have hereunto set our hands this 24th day of May 1911.

NILS NILSON.
LEONARD NILSON.

Witnesses:
GENEVIEVE E. SORENSEN,
EDWARD A. PAUL.